United States Patent
Lyle et al.

(10) Patent No.: US 11,131,553 B1
(45) Date of Patent: Sep. 28, 2021

(54) DRIVER FEEDBACK AND REROUTING IN RESPONSE TO ADVERSE DRIVING CONDITIONS

(71) Applicant: UIPCO, LLC, San Antonio, TX (US)

(72) Inventors: Ruthie D. Lyle, Durham, NC (US); Gregory Brian Meyer, San Antonio, TX (US); Sean Carl Mitchem, San Antonio, TX (US); Will Kerns Maney, Jr., San Antonio, TX (US); Deborah Janette Schulz, San Antonio, TX (US); Bryan J. Osterkamp, New Braunfels, TX (US); Timothy Blair Chalmers, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/724,440

(22) Filed: Dec. 23, 2019

Related U.S. Application Data

(60) Provisional application No. 62/785,270, filed on Dec. 27, 2018.

(51) Int. Cl.
| | |
|---|---|
| *G01C 21/34* | (2006.01) |
| *G01C 21/36* | (2006.01) |
| *B60W 40/064* | (2012.01) |
| *B60W 50/14* | (2020.01) |
| *G06Q 40/08* | (2012.01) |
| *B60W 30/095* | (2012.01) |

(52) U.S. Cl.
CPC ..... *G01C 21/3415* (2013.01); *B60W 30/0956* (2013.01); *B60W 40/064* (2013.01); *B60W 50/14* (2013.01); *G01C 21/3461* (2013.01); *G01C 21/3691* (2013.01); *G06Q 40/08* (2013.01); *B60W 2050/143* (2013.01)

(58) Field of Classification Search
CPC .................................................. G01C 21/3415
See application file for complete search history.

(56) References Cited

U.S. PATENT DOCUMENTS

| | | | |
|---|---|---|---|
| 6,226,389 B1 * | 5/2001 | Lemelson ............ | G07C 5/0891 382/104 |
| 10,156,848 B1 * | 12/2018 | Konrardy .......... | B60W 30/0956 |
| 2014/0002277 A1 * | 1/2014 | Fulger ............... | G01C 21/3691 340/905 |
| 2017/0032677 A1 * | 2/2017 | Seo ........................ | B60Q 9/008 |
| 2017/0352271 A1 * | 12/2017 | Aoyagi ..................... | G08G 1/16 |

* cited by examiner

*Primary Examiner* — Peter D Nolan
*Assistant Examiner* — Clarence D McCray
(74) *Attorney, Agent, or Firm* — Plumsea Law Group, LLC

(57) ABSTRACT

A system and method for monitoring driving conditions and reacting to the driving conditions is disclosed. The system includes a risk monitoring system that can detect adverse road conditions. The method includes performing rerouting when hazardous road conditions are detected. The vehicle may be routed along a different route that lacks the hazardous road condition. The method also includes providing feedback to the driver when adverse driver behavior, such as a drowsy driver, is detected.

20 Claims, 7 Drawing Sheets

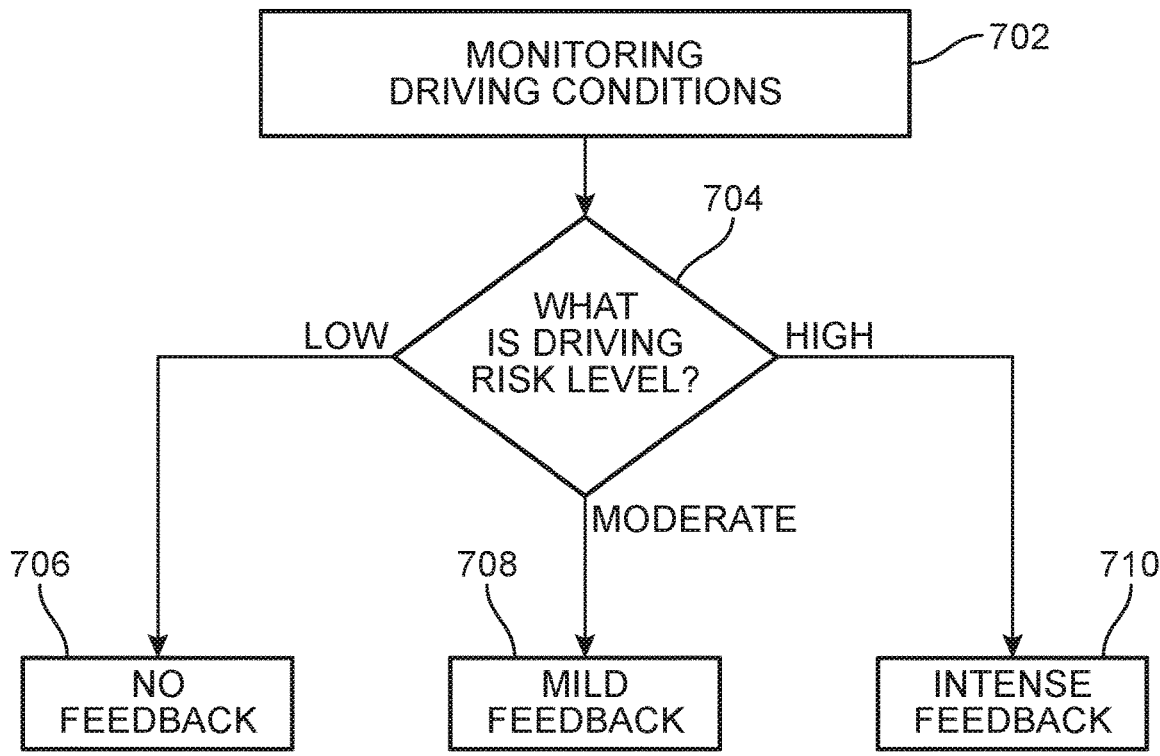

DRIVER FEEDBACK AND REROUTING IN RESPONSE TO ADVERSE DRIVING CONDITIONS

CROSS-REFERENCE TO RELATED APPLICATIONS

This application claims the benefit of Provisional Patent Application No. 62/785,270 filed Dec. 27, 2018, and titled "Driver Feedback and Rerouting in Response to Adverse Driving Conditions," which is incorporated by reference herein in its entirety.

TECHNICAL FIELD

The present disclosure generally relates to driving risks, and in particular to reducing risky driving behaviors.

BACKGROUND

Driving risks can increase depending on both driving behaviors as well as driving conditions (e.g., road conditions). Currently, insurance companies assess driving risks primarily by asking customers to provide estimates of how long they drive a vehicle each month, as well as other information provided during the insurance approval process. Insurers lack systems for assessing driving risks in real time. Insurers and/or manufacturers also lack systems for encouraging drivers to avoid high risk areas or to reduce risky driving behaviors in real-time.

There is a need in the art for a system and method that addresses the shortcomings discussed above.

SUMMARY

In one aspect, a method of generating navigation routes for a motor vehicle in response to hazardous road conditions includes steps of retrieving a current location for the motor vehicle. The method also includes detecting a hazardous road condition at a hazardous location, where the hazardous location is disposed along a projected driving route. The method also includes generating a new navigation route that avoids the hazardous location and informing a driver of the motor vehicle that the new navigation route is available.

In another aspect, a method of generating feedback for a driver of a motor vehicle includes the steps of receiving information from one or more sensors of the motor vehicle, analyzing the information from the one or more sensors to determine a first driving safety level, providing a first feedback to the driver based on the first driving safety level, determining a second driving safety level, and providing a second feedback to the driver based on the second driving safety level.

In another aspect, a method of determining motor vehicle operating conditions and adjusting an insurance policy for the motor vehicle in response includes the steps of detecting an adverse driving condition, determining an accident risk level associated with the adverse driving condition, and adjusting the insurance policy according to the accident risk level.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 7 is a schematic view of a process for providing feedback in response to different driving risk levels, according to an embodiment; and FIG. 8 is a schematic view of different types of feedback that may be used with the process of FIG. 7.

DESCRIPTION OF EMBODIMENTS

The system and method include a risk monitoring system that can detect adverse driving conditions, including both adverse driving behaviors and hazardous road conditions. When hazardous road conditions are detected, the system may automatically generate a new navigation route to bypass the hazardous road conditions and reduce driving risk. When adverse driving behaviors are detected, the system may automatically provide feedback to the driver so the driver can take appropriate actions to reduce driving risks. The method can also include updating an insurance policy associated with the vehicle and driver based on monitoring driving risk over a period of time.

By automatically rerouting drivers around hazardous road conditions, the system and method improve driving safety and lower the coverage risks to any insurers who providing insurance for the vehicle and/or driver. Likewise, by providing feedback to drivers when the driver engages in adverse (or risky) driving behavior, the system and method may improve driving safety and also lower the coverage risks to insurers.

Figure 1:
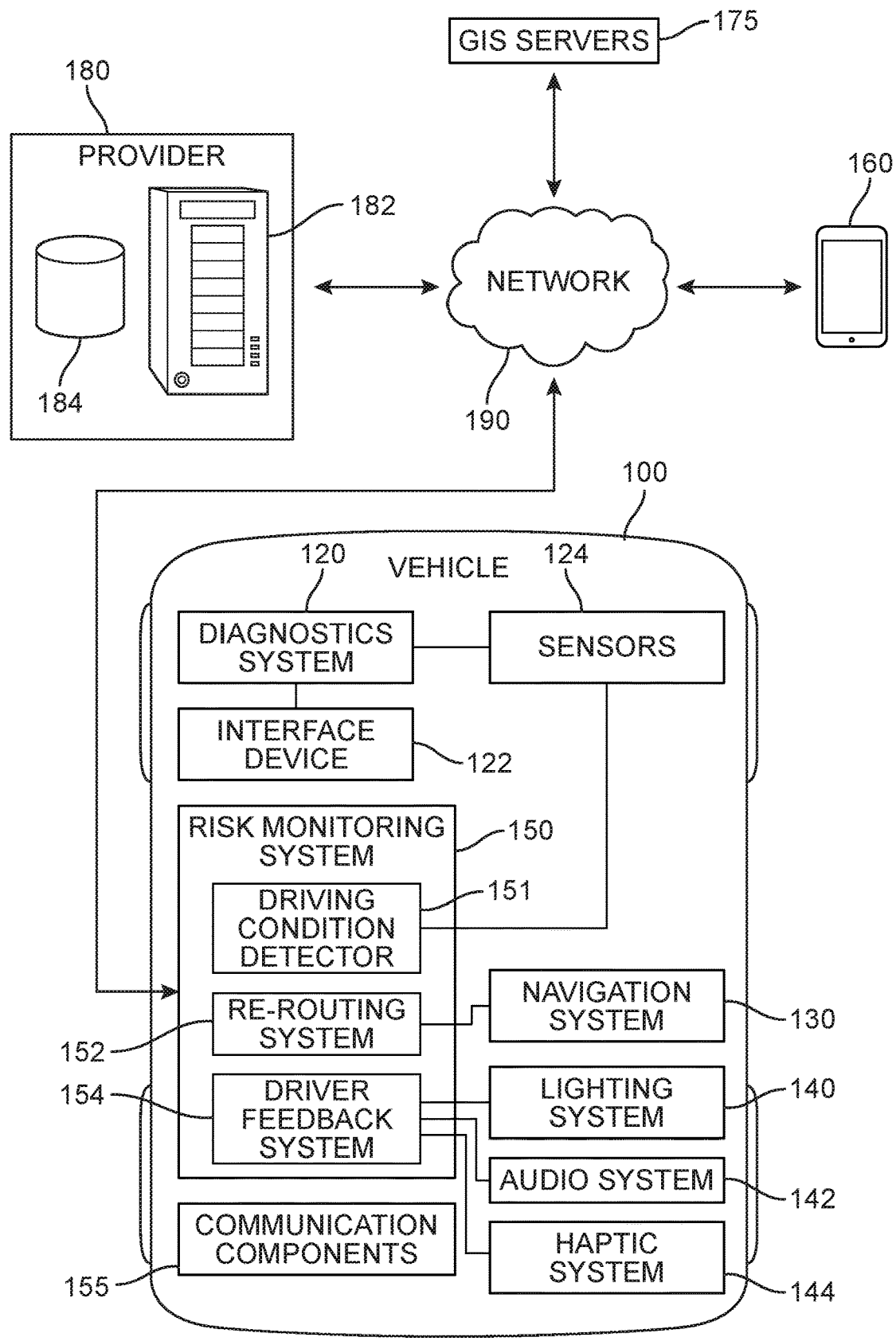
FIG. 1 is a schematic view of a vehicle customization platform, according to an embodiment.

FIG. 1 is a schematic view of a vehicle 100, as well as systems that may be in communication with systems of the vehicle. Within vehicle 100, several different systems and components are depicted schematically. These components and systems may be separate from the vehicles onboard computer. Each component or system could comprise one or more processors and memory for implementing instructions using the processors. Some components and systems could share processors and/or memory. In some embodiments, some of these systems and components may be associated with an onboard computer for vehicle 100.

Vehicle 100 includes a diagnostics system 120 and an interface device 122. In some embodiments, information from sensors 124 disposed in or on vehicle 100 may only be accessible through a diagnostics system 120. Diagnostics system 120 may be associated with on-board diagnostics (OBD) capabilities. In some cases, diagnostics system 120 may comprise part of an onboard computing system of vehicle 100.

To access diagnostics system 120, some embodiments may include an interfacing device 122. Interfacing device 122 may include any device that can interface with diagnostics system 120. Interfacing device 122 could communicate with diagnostics system 120 using various interfacing protocols and hardware. Exemplary interfaces include OBD-I, OBD-1.5, and OBD-II. Interfacing devices can comprise hand-held scan tools, mobile device-based tools, PC-based scan tools, data loggers and telematics devices.

In one embodiment, interfacing device 122 is a telematics device. The term "telematics device" refers to any device that can plugged into an interfacing port (for example, an OBD-II port) on a vehicle and used to track information from sensors and/or other onboard systems. In some embodiments, a telematics device may be configured to wirelessly communicate with other computing devices. In other embodiments, a telematics device may track and store information that can be accessed at a later time by removing the device and plugging it into another computing device (for example, using a USB cord).

Vehicle 100 may also include an onboard navigation system 130. In some cases, navigation system 130 includes a GPS receiver that can receive GPS information.

Vehicle 100 can include a lighting system 140. Lighting system 140 may comprise any lights associated with the interior or exterior of a vehicle. In some embodiments, lighting system 140 is associated with interior lights. These may include overhead lights used to illuminate the cabin and/or other indicator lights that could be disposed on the dashboard, for example. Using lighting system 140, visual warnings can be delivered to a driver or other user as described in further detail below.

Vehicle 100 can also include an audio system 142. Audio system 142 may include any components needed to generate audible sounds. Audio system 142 may include one or more speakers disposed in the vehicle. Using audio system 142, audible warnings can be delivered to a driver or other user as described in further detail below.

Vehicle 100 can also include a haptic feedback system 144, or simply haptic system 144. Haptic feedback system 144 may include any components needed to generate vibrations or other tactile sensations that can be felt by a driver. Haptic feedback system 144 may include one or more motors for generating vibrations. Exemplary locations for haptic components include steering wheels and seats. Using haptic feedback system 144, haptic warnings can be delivered to a driver or other user as described in further detail below.

Vehicle 100 may include risk monitoring system 150. Risk monitoring system 150 may comprise any hardware and/or software used for monitoring conditions inside and/or outside a vehicle for purposes of risk management. Risk monitoring system 150 may receive information about conditions inside and/or outside of a vehicle by retrieving information from diagnostics system 120 (through interface device 122). Vehicle system 150 may also optionally receive information directly from one or more sensors 124.

Risk monitoring system 150 can include a driving condition detector 151. Driving condition detector 151 may be used to detect adverse driving conditions, as discussed in further detail below.

Risk monitoring system 150 may further include a re-routing system 152. As described in further detail below, re-routing system 152 may generate new routes in response to assessed risks along a current route. To get information about a current route, risk monitoring system 150 may communicate with navigation system 130.

Risk monitoring system 150 may also include a driver feedback system 154. As discussed in further detail below, driver feedback system 154 may provide feedback to a driver to alert the driver of adverse driving conditions. Adverse driving conditions could include both adverse driving behaviors, as well as adverse road conditions. In some embodiments, driver feedback system 154 provides alerts or warnings to a driver using lighting system 140, audio system 142, and/or haptic system 144.

Risk monitoring system could also communicate with a user device 160, which may be carried in, or adjacent to, vehicle 100. User device 160 may comprise a computing system for processing and communicating information. A user device may generally include a processor, a data storage component, and a display. A user device may also include components to facilitate communication with external systems (for example, hardware and software components to enable communication over network 190). In some cases, a user device includes one or more physical buttons. In some cases, a user device includes touchscreen controls. Additionally, user device 160 could include additional sensors including, but not limited to: accelerometers, gyroscopes, magnetometers, GPS receivers, barometers, proximity sensors and ambient light sensors.

In the exemplary embodiment of FIG. 1, user device 160 comprises a mobile device. Specifically, user device 160 comprises smartphone. In other embodiments, user device 160 could be a tablet computing device. In still other embodiments, however, a user device could comprise a laptop, a desktop computer, or similar kind of device.

Risk monitoring system 150 may communicate with user device 160 to retrieve various kinds of sensed information and/or GPS information. Risk monitoring system 150 may also communicate with user device 160 to assess risks associated with using a smartphone or similar device while driving. For example, risk monitoring system 150 could request information from user device 160 to determine if the driver is texting while driving.

Risk monitoring system 150 may communicate with Geospatial Information System (GIS) servers 175 over a network 190. In some embodiments, risk monitoring system 150 may retrieve GIS based information, including flooding information, from GIS servers 175.

Risk monitoring system 150 may also communicate with a provider 180 over network 190. In some cases, provider 180 is an insurance provider. The term "insurance provider" as used herein refers to any institutions or companies that provide insurance products. Insurance products can include home owner's insurance, renter's insurance, commercial property insurance, and vehicle insurance. An insurance product may be characterized by an insurance policy, which is a contract between an insurance provider (the "insurer") and a policy holder (the "insured"). In cases where vehicle insurance is provided, the policy holder may be an owner, or driver, of a vehicle. The policy holder may also be referred to as a customer of the insurance provider.

In the embodiment of FIG. 1, provider 180 includes one or more computing devices 182 (for example, a server) that may be in communication with one or more databases 184. Computing device 182 may include one or more processors and a non-transitory computer readable medium. Instructions stored on the non-transitory computer readable medium may be executed by the one or more processors. Databases 184 could be co-located with computing device 182 or could be remote databases that are accessible by computing device 182 over a network. Databases 184 can include any kind of storage devices, including but not limited magnetic, optical, magneto-optical, and/or memory, including volatile memory and non-volatile memory.

As described below, in some embodiments, risk monitoring system 150 may send information to provider 180 related to risky driving behaviors. In turn, provider 180 may process this information and adjust the insurance rates for the associated insurance policy. In some embodiments, risk monitoring system 150 may also send information to a driver's loved ones and/or other persons.

Vehicle 100 can also include various communication components 155. Communication components 155 may include a variety of different technologies for sending messages, commands and/or control signals to user device 160 and/or for communicating with provider 180 over network 190. Communication components could also be used to transmit information between systems and components within vehicle 100. Exemplary communication components include, but are not limited to: cellular network components, WiFi components, personal area network (PAN) components and RF ID components.

Figure 2:
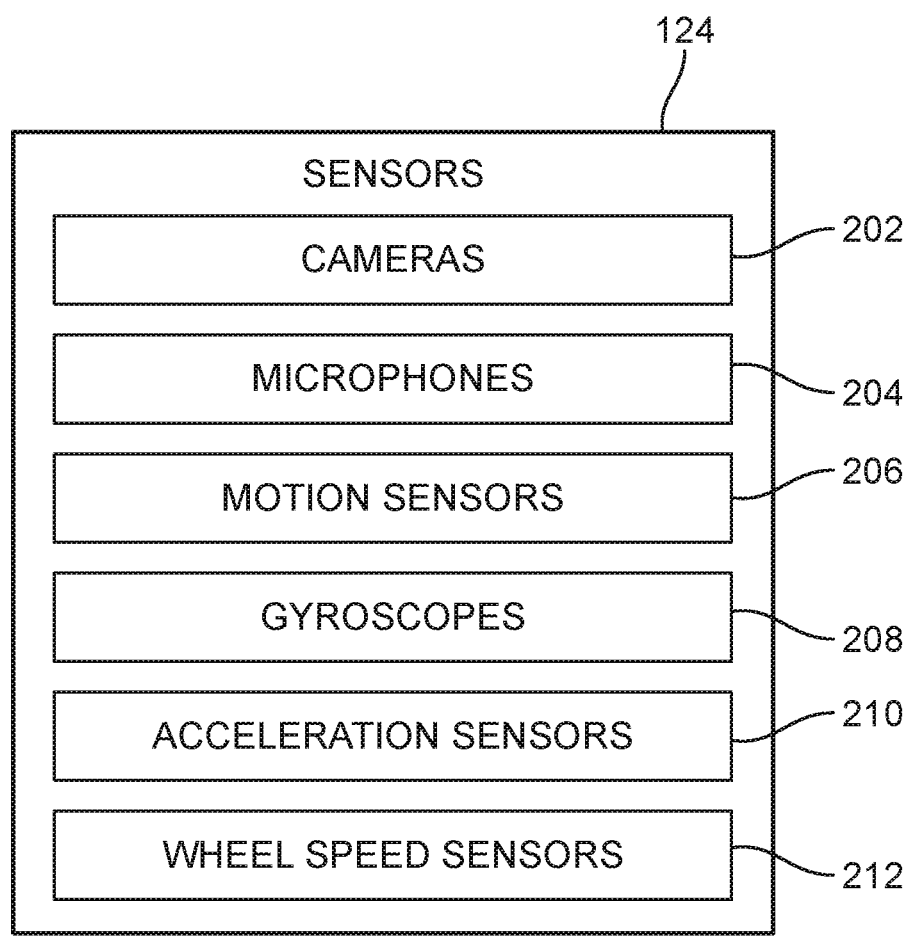
FIG. 2 is a schematic view of multiple sensors that could be used with the vehicle of FIG. 1.

FIG. 2 is a schematic view of various kinds of sensors 124 that could be associated with vehicle 100. Cameras 202 could include any kind of cameras known in the art for use in vehicles or mobile devices. Vehicle 100 could include cameras in a dashboard or rearview mirror, for example.

Microphones 204 could include any kind of microphones known in the art for use in vehicles or mobile devices. Vehicle 100 could include microphones embedded in a dashboard, in a rearview mirror or other locations.

Motion sensors 206 could comprise any kinds of motions sensors known in the art. These may include, but are not limited to: passive infrared sensors, microwave sensors, and ultrasonic sensors. Motion sensors could be deployed at selective locations in a vehicle and/or user device.

Gyroscopes 208 could comprise any kind of sensors for measuring orientation and angular velocity. These may include, but are not limited to mechano-electrical systems (MEMS) gyroscopes, solid-state gyroscopes and fibre-optic gyroscopes.

Acceleration sensors 210 could comprise any kinds of sensors for measuring acceleration. These may include mechano-electrical systems (MEMS) accelerometers, piezoresistive accelerometers, and piezoelectric accelerometers.

Wheel speed sensors 212 could include any sensors known in the art for measuring the speed of a wheel's rotation. These may include magnetic inductive (passive) wheel speed sensors and magneto-resistive (active) wheel speed sensors. In some embodiments, wheel speed sensors may also be used to detect when braking occurs.

Figure 3:
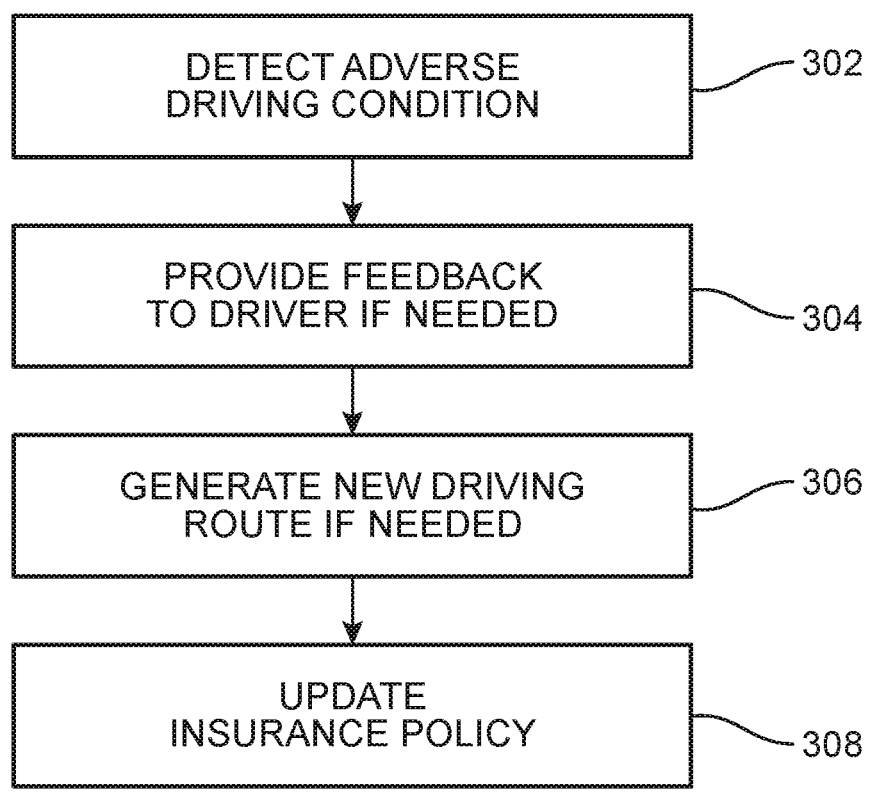
FIG. 3 is a schematic process for detecting adverse driving conditions and taking actions in response, according to an embodiment.

FIG. 3 is a schematic view of a process for detecting adverse driving conditions and taking actions in response. In step 302, an adverse driving condition may be detected. In some cases, the adverse driving condition can be an adverse driving behavior. In other cases, the adverse driving condition can be an adverse or hazardous road condition.

Next, in an optional step 304, feedback could be provided to the driver. The feedback may be indicative of adverse driving conditions. Feedback may be provided when the adverse driving condition is adverse driving behavior and/or a hazardous road condition. For example, if the driver is drowsy, feedback may be provided to alert the driver that he or she is engaging in riskier driving behavior. As another example, if the current road is icy, feedback may be provided to alert the driver that continuing on the current road is risky.

In some cases, the feedback is associated with adjusting one or more lights in the vehicle. In other cases, the feedback is associated with generating audible noises. In still other cases, other kinds of feedback could be used, including tactile feedback produced by a haptic feedback system.

In an optional step 306, a new driving route could be provided if needed. New driving routes may be generated when the adverse driving condition is a hazardous road condition. For example, if icy road conditions are detected, a new route could be generated along routes likely to have less ice (for example, major highways that tend to be plowed/salted first).

In another optional step 308, an insurance policy could be updated in response to adverse driving conditions detected above. In some embodiments, an insurance provider could track how much driving time is spent in adverse driving conditions. As the relative proportion of driving time spent in adverse conditions to total driving time increases, the insurance premium could be increased to account for the higher driving risk.

Figure 4:
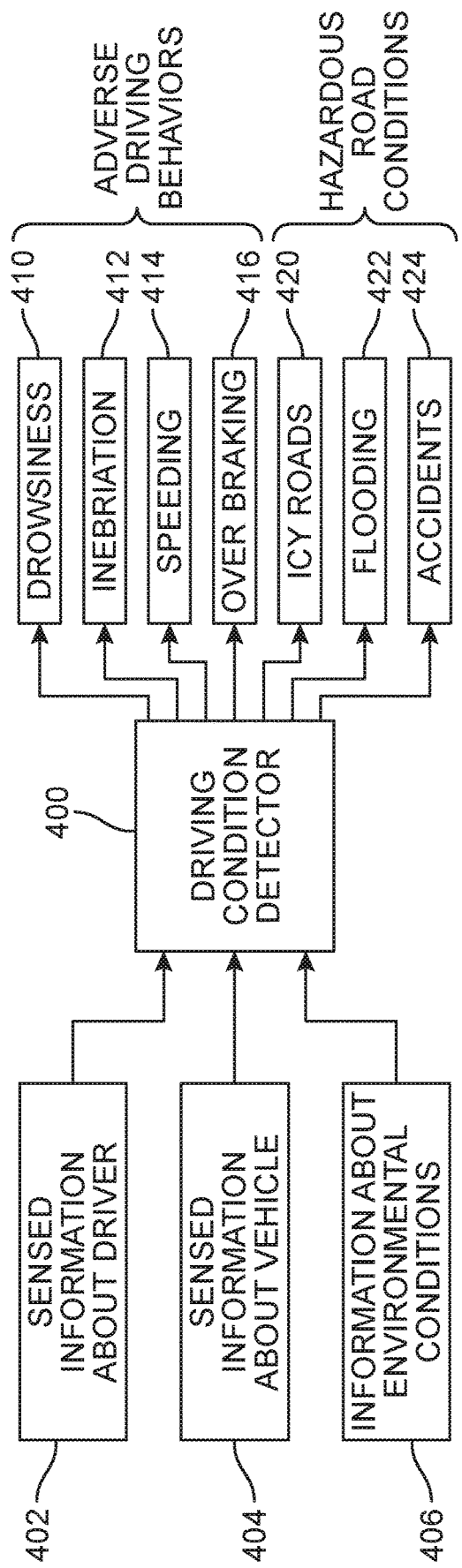
FIG. 4 is a schematic view of a driving condition detector, according to an embodiment.

FIG. 4 is a schematic view of a driving condition detector 400. Driving condition detector 400 may comprise multiple algorithms for detecting adverse driving conditions based on sensory inputs. In one embodiment, driving condition detector 400 receives sensed information about a driver 402. This may include any information about how the driver is behaving. Driver behavior could be detected using information from cameras (for example, cameras 202) and microphones (for example, microphones 204). In some embodiments, images of the driver could be processed by a machine learning system to detect aberrant behavior such as when a driver's head is dropping while they are sleepy or erratic movements that may occur if the driver is inebriated. In some embodiments, sounds from the interior cabin could be processed by a machine learning system to detect any aberrant noises that might indicate that the driver has fallen asleep, is inebriated, or is otherwise engaging in risky driving behavior.

In one embodiment, driving condition detector 400 receives sensed information about the vehicle 404. This may include vehicle speed, vehicle acceleration, braking information and other vehicle information. In some embodiments, sensed information about the vehicle could also include information provided by one or more vehicle safety systems, such as lane keep assistance systems and collision warning systems. This information may be analyzed using one or more machine learning algorithms to detect if a driver is traveling too fast, accelerating or decelerating too quickly, swerving off the road, and/or braking in an unsafe manner.

In one embodiment, driving condition detector 400 receives sensed information about environmental conditions 406. These can include roadway conditions. For example, icy roadway conditions can be inferred by analyzing wheel slip using, for example, wheel speed sensors. As another example, flooding on a roadway can be determined by retrieving GIS information (for example, from GIS servers 175).

Based on the provided sensory information (along with retrieved data such as GIS data), driving condition detector 400 may detect possible adverse driving conditions. Some possible adverse driving conditions are depicted as outputs in FIG. 4. Among these conditions are adverse driving behaviors such as drowsiness 410, inebriation 412, speeding 414, and over braking 416. These adverse driving behaviors are behaviors that can potentially be overcome by the driver by changing his or her behavior, or by taking safety precautions. For example, a drowsy driver may pull over and rest. As another example, a speeding driver could slow down. Because the driver may change their behavior, this subset of adverse driving conditions may be most amenable to providing feedback to a driver so that the driving behavior can be changed.

The outputs of driving condition detector 400 also include hazardous road conditions. These include, for example, icy roads 420, flooding 422, and accidents 424. By contrast with the adverse driver behaviors, the driver has little to no control over hazardous road conditions. Therefore, the best course of action for hazardous road conditions may be to find better routes with fewer or no hazards.

Figure 5:
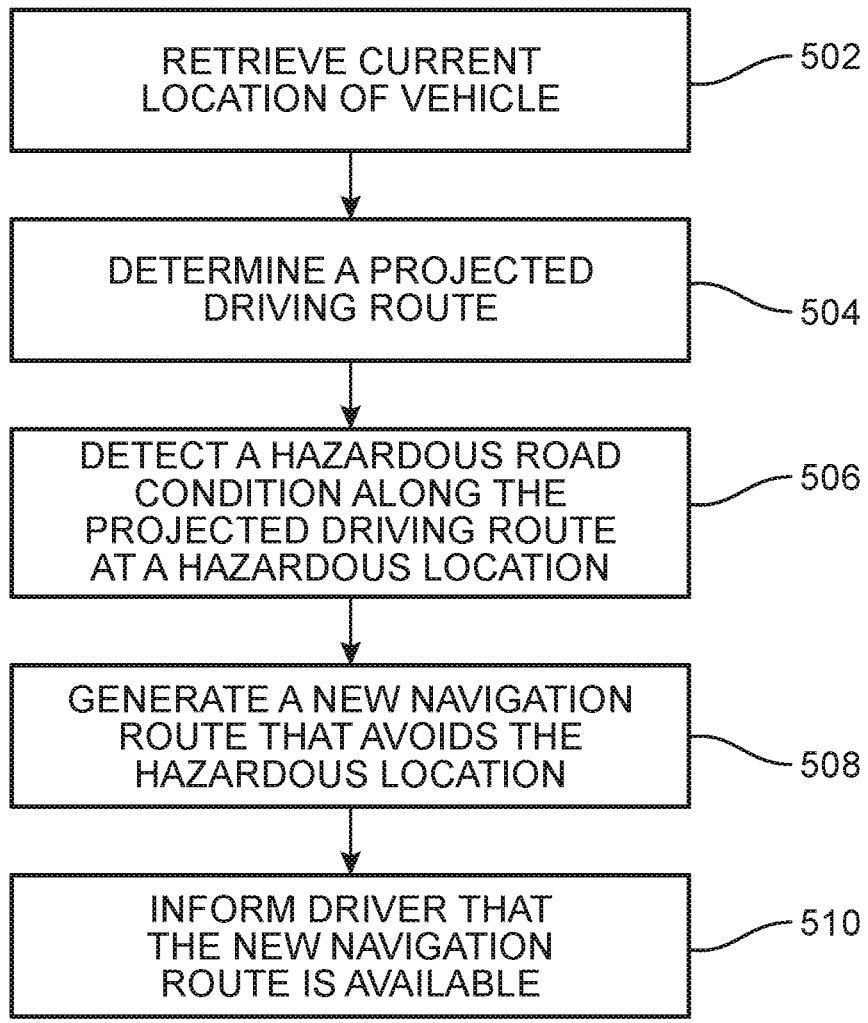
FIG. 5 is a schematic process for generating a new navigation route in response to a hazardous road condition, according to an embodiment.

FIG. 5 is a schematic view of a process for generating a new navigation route in response to detecting a hazardous road condition. In some embodiments, one or more of the following steps could be performed by a risk monitoring system (for example, risk monitoring system 150 of FIG. 1). It may be appreciated that in some embodiments, one or more of these steps could be optional.

In step 502, risk monitoring system 150 may retrieve a current location for the vehicle. The current location can be retrieved from navigation system 130. Next, in step 504, risk monitoring system 150 could determine a projected driving route. In some cases, the projected driving route could be associated with a current navigation route that has been generated by navigation system 130. In other cases, the current road the vehicle is driving on could be selected as the projected driving route.

Next, in step 506, risk monitoring system 150 could detect a hazardous road condition along the projected driving route. Moreover, risk monitoring system 150 could determine a hazardous location along the projected driving route where a hazardous road condition occurs. In some cases, the hazardous road condition could be detected using information from onboard sensors. For example, icy road conditions could be inferred from monitoring wheel speed and detecting if wheel slip has occurred. In other cases, the hazardous road condition could be detected using external information, such as information from a GIS system. For example, roadway flooding could be determined by retrieving GIS information, including real-time data and/or forecasted data.

In step 508, risk monitoring system 150 may generate a new navigation route that avoids the hazardous location. In some cases, generating the new navigation route includes sending a request to navigation system 130 to generate a new route that avoids the hazardous location. If the navigation system is already guiding the driver along an existing navigation route, the new route could be provided as an alternative route.

In step 510, risk monitoring system 150 may inform the driver that the new navigation route is available. In some embodiments, risk monitoring system 150 automatically switches to the new navigation route (or starts the new route when there is no active navigation route already). In other embodiments, risk monitoring system 150 may ask the user if they want to change to the new navigation route. This could be accomplished using a message on a touch based screen, for example.

Figure 6:
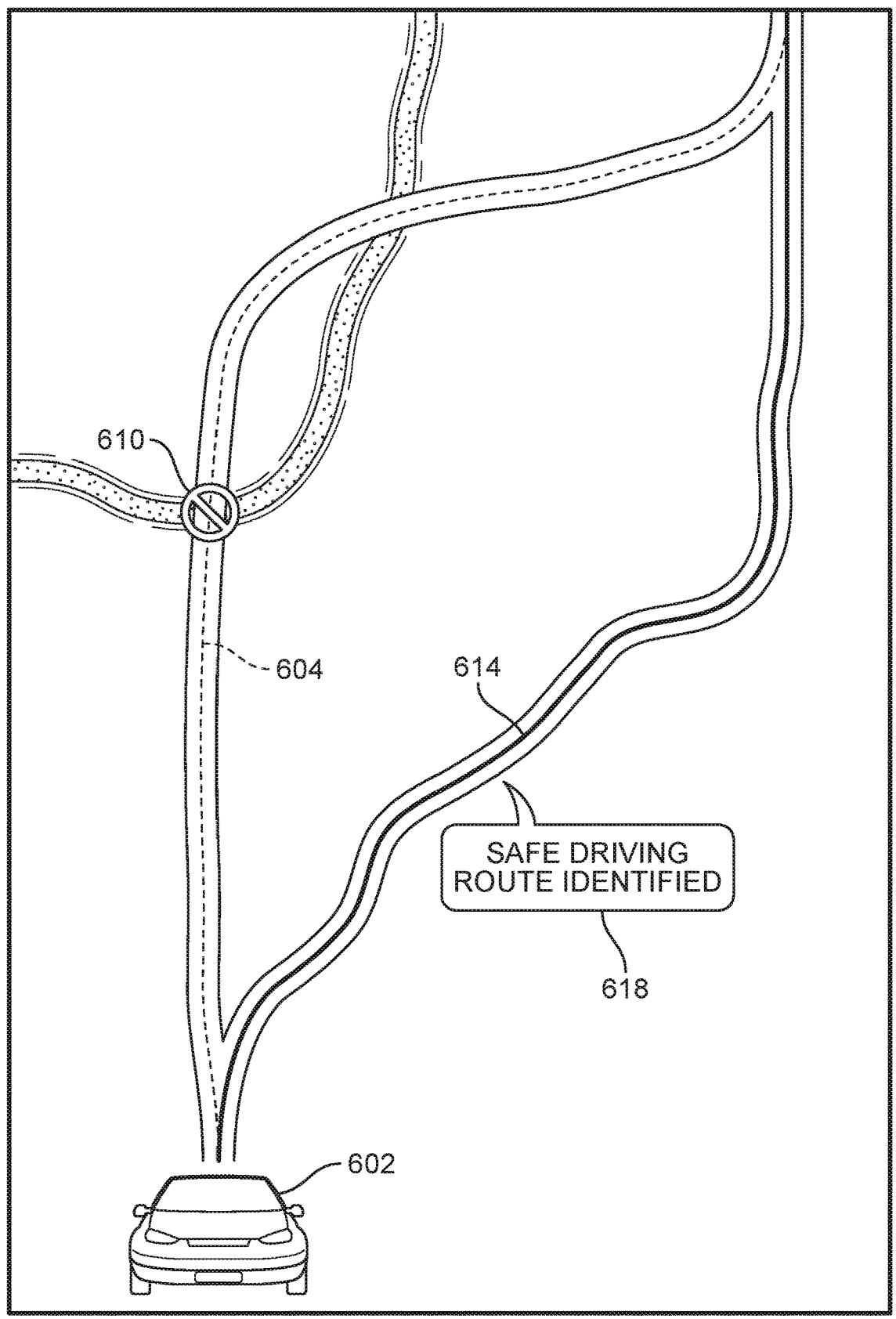
FIG. 6 is a schematic view of an alternative navigation route generated according to the process of FIG. 5.

FIG. 6 depicts an exemplary scenario where some of the steps of the process of FIG. 5 have been performed. Referring to FIG. 6, the current location of a vehicle 602 is determined along with a projected driving route 604. Here, projected driving route 604 is simply the road the vehicle is currently driving on. After detecting flooding (a hazardous road condition) further down the road at hazardous location 610, a new route 614 is generated. The driver may also be notified that a safer route has been identified using message 618. This allows the vehicle to bypass the flooding and minimize driving risk throughout the remainder of the trip. In contrast to systems that might look for alternative routes to minimize driving time, or miles driven, the exemplary system looks for the safest routes available given any hazardous road conditions.

FIG. 7 is a schematic view of a process for generating feedback in response to driving risk levels. Here, driving risk levels may be associated with driving conditions. Adverse driving behaviors and/or adverse road conditions could be associated with moderate to high levels of driving risk. By contrast, normal driving behaviors and/or normal road conditions could be associated with low levels of driving risk.

In a first step 702, risk monitoring system 150 may monitor driving conditions. This may include monitoring any of the sensory information described above with respect to FIG. 4. Next, in step 704, risk monitoring system 150 may assess the driving risk level. The driving risk level may be determined according to the type of behavior, and/or the extent of the behavior. For example, speeding may be considered an adverse driving behavior, so may not be assigned a low driving risk level. Speeding a few miles above the speed limit may be assigned an intermediate driving risk level, while speeding ten or more miles above the speed limit may be assigned a high driving risk level.

If the driving risk level is determined to be low in step 704, no feedback may be provided in step 706. If the driving risk level is determined to be moderate in step 704, mild feedback may be provided in step 708. If the driving risk level is determined to be high in step 704, intense feedback may be provided in step 710.

FIG. 8 is a schematic view of a table that shows exemplary types of feedback for different risk levels. In a first row 802, visual feedback may go from no lighting (or default lighting) for low risk, to dim lighting for moderate risk, to bright lighting for high risk. Of course, this is only an exemplary mode of feedback. In another embodiment, rather than changing the brightness, the color of the lighting could be changed, moving from a normal white/yellow light for low risk, through blue light for moderate risk and to red light for high risk.

In a second row 804, audible feedback may go from no sound for low risk, soft sounds for moderate risk and loud sounds for high risk. Of course, this is only an exemplary mode of feedback. In another embodiment, rather than changing the volume of the audio, the frequency of sounds could change.

In a third row 806, haptic feedback may go from no vibrations for low risk, gentle vibrations for moderate risk, to harsh vibrations for high risk. Of course, this is only an exemplary mode of feedback. In another embodiment, rather than changing the intensity of vibrations, the frequency of vibrations could change.

The embodiments make use of one or more motor vehicles. As used herein, the term "motor vehicle," or simply vehicle, refers to any kind of car, van, truck, motorcycle, or similar motorized vehicle. A motor vehicle can be powered using an internal combustion engine, an electric motor, a hybrid of an internal combustion engine and an electric motor, as well as any other suitable power source. A motor vehicle may further include wheels that are powered by the engine or motor and components for controlling the vehicle (for example, pedals and a steering wheel).

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of generating navigation routes for a motor vehicle in response to hazardous road conditions, the method comprising the steps of:
   retrieving a current location for the motor vehicle;
   detecting a hazardous road condition at a hazardous location, the hazardous location being disposed along a projected driving route;
   generating a new navigation route that avoids the hazardous location;
   informing a driver of the motor vehicle that the new navigation route is available;
   wherein the motor vehicle is associated with an insurance policy and wherein the method includes automatically adjusting the insurance policy when the driver ignores the new navigation route that avoids the hazardous location and continues driving along the projected driving route that includes the hazardous location;

wherein automatically adjusting the insurance policy includes:
- tracking an amount of driving time of the motor vehicle along the projected driving route that includes the hazardous location;
- determining a total amount of driving time of the motor vehicle; and
- increasing an insurance premium of the insurance policy when a relative proportion of the amount of driving time along the projected driving route that includes the hazardous location to the total amount of driving time increases.

2. The method according to claim 1, wherein the hazardous road condition is ice, and wherein detecting the hazardous road condition comprises analyzing wheel speed information to detect wheel slip.

3. The method according to claim 1, wherein the hazardous road condition is flooding and wherein detecting the hazardous road condition includes analyzing information from a geographic information system.

4. The method according to claim 1, wherein the hazardous road condition is an accident and wherein detecting the hazardous road condition comprises analyzing information from real-time traffic data.

5. The method according to claim 1, wherein the projected driving route is a road the vehicle is currently driving on.

6. The method according to claim 1, wherein the projected driving route is a current navigation route.

7. The method according to claim 1, wherein informing the driver includes alerting the driver about the hazardous road condition.

8. The method according to claim 1, wherein, when the new navigation route that avoids the hazardous location is available, the method further includes automatically switching navigation of the motor vehicle to the new navigation route without input from the driver.

9. A method of generating feedback for a driver of a motor vehicle to alert the driver of adverse driving conditions, the method comprising the steps of:
- receiving information from one or more sensors of the motor vehicle at a driving condition detector in the motor vehicle;
- analyzing, by the driving condition detector, the information from the one or more sensors to determine one or more adverse driving conditions;
- using the determined one or more adverse driving conditions to determine a first driving safety level;
- providing a first feedback to the driver based on the first driving safety level;
- determining a second driving safety level;
- providing a second feedback to the driver based on the second driving safety level;
- detecting, by the driving condition detector, a hazardous road condition at a hazardous location, the hazardous location being disposed along a projected driving route;
- generating a new navigation route that avoids the hazardous location;
- informing the driver of the motor vehicle that the new navigation route is available;
- wherein the motor vehicle is associated with an insurance policy and wherein the method includes automatically adjusting the insurance policy when the driver ignores the new navigation route that avoids the hazardous location and continues driving along the projected driving route that includes the hazardous location;
- wherein automatically adjusting the insurance policy includes:
  - tracking an amount of driving time of the motor vehicle along the projected driving route that includes the hazardous location;
  - determining a total amount of driving time of the motor vehicle; and
  - increasing an insurance premium of the insurance policy when a relative proportion of the amount of driving time along the projected driving route that includes the hazardous location to the total amount of driving time increases.

10. The method according to claim 9, wherein the first driving safety level is a moderate driving risk level and wherein the first feedback includes at least one type of feedback selected from visual feedback, audible feedback, or haptic feedback; and
- wherein the second driving safety level is different from the first driving safety level and is a high driving risk level and wherein the second feedback includes the same type of feedback as the first feedback and wherein the second feedback is different from the first feedback.

11. The method according to claim 10, wherein the first feedback and second feedback comprise different sounds from an audio system.

12. The method according to claim 10, wherein the first driving safety level and the second driving safety level correspond to different road conditions.

13. The method according to claim 12, wherein the first driving safety level is associated with dry road conditions.

14. The method according to claim 13, wherein the second driving safety level is associated with wet road conditions.

15. The method according to claim 13, wherein the second driving safety level is associated with icy road conditions.

16. The method according to claim 10, wherein the first feedback and second feedback comprise visual feedback;
- wherein the first feedback associated with the moderate driving risk level is dim lighting; and
- wherein the second feedback associated with the high driving risk level is bright lighting.

17. The method according to claim 10, wherein the first feedback and second feedback comprise audio feedback;
- wherein the first feedback associated with the moderate driving risk level is a sound having a first frequency; and
- wherein the second feedback associated with the high driving risk level is a sound having a second frequency that is higher than the first frequency.

18. The method according to claim 10, wherein the first feedback and second feedback comprise haptic feedback;
- wherein the first feedback associated with the moderate driving risk level is a vibration having a first intensity; and
- wherein the second feedback associated with the high driving risk level is a vibration having a second intensity that is higher than the first intensity.

19. The method according to claim 10, wherein the first feedback and second feedback comprise haptic feedback;
- wherein the first feedback associated with the moderate driving risk level is a vibration having a first frequency; and
- wherein the second feedback associated with the high driving risk level is a vibration having a second frequency that is higher than the first frequency.

20. The method according to claim 10, wherein the first feedback and the second feedback comprise different colors of a lighting system.

* * * * *